Patented Aug. 3, 1954

2,685,598

UNITED STATES PATENT OFFICE 2,685,598

METHOD FOR ACETYLATING TERTIARY ALCOHOLS

John R. Caldwell, Kingsport, Tenn., assignor to Eastman Kodak Company, Rochester, N. Y., a corporation of New Jersey No Drawing. Application March 8, 1951,
Serial No. 214,650

7 Claims. (Cl. 260—488)

This invention relates to the preparation of tertiary alcohol acetates by acetylating tertiary alcohols with ketone in the presence of a silica-alumina type catalyst.

It has been recognized that tertiary alcohols are not as readily susceptible to acetylation as are primary and secondary alcohols. For instance, with acetic anhydride or acetyl chloride, acetylation is difficult, and when mineral acid catalysts such as sulfuric acid, toluene sulfonic acid, hydrochloric acid, or the like are employed therewith, those acids cause dehydration or rearrangement of the tertiary alcohols, and hence a low yield of tertiary alcohol acetate is obtained. Acetylation of tertiary alcohols with ketene has been suggested, but it has been recognized that the yields of tertiary alcohol acetate prepared by this method are not those desired in practical operations. Also, in the acetylation of acetylenic and olefinic tertiary alcohols, the reactivity of the unsaturated linkages makes acetylation of those alcohols by the usual methods especially difficult.

One object of my invention is to provide acetates of tertiary alcohols. Another object of my invention is to provide a method for preparing tertiary alcohol acetates in which those acetates are obtained in good yield. A further object of my invention is to provide a method for acetylating tertiary alcohols which are somewhat susceptible to decomposition, such as olefinic and acetylenic alcohols, without causing any decomposition or inducing side reactions therein.

These objects of my invention are accomplished by reacting ketene with tertiary alcohol in the presence of a special type of silica-alumina catalyst. The catalyst used does not catalyze the rearrangement or decomposition of the alcohols, but does give acetylated products in good yield. The products obtained in accordance with my invention may be conveniently isolated from the reaction mass by simple distillation because there are substantially no by-products therein and the final reaction mixture consists of the acetate of the tertiary alcohol and the unreacted alcohol. The catalyst, which is insoluble in the mass, can be removed by filtration.

The catalysts which are adapted for use in my process are compositions of alumina-silica-thoria and alumina-silica-zirconia. These catalysts may be prepared in accordance with the methods described in the following disclosures: Journal of the American Chemical Society 66, 1586–89 (1944); 66, 1694–96 (1944); U. S. Patents Nos. 2,229,353; 2,242,553; 2,462,357; and 2,347,648. These catalysts promote the acetylation of tertiary alcohols with ketene at temperatures ranging from 10° C. to about 80° C. The catalyst may be employed in the alcohol in a proportion of 0.1% to 5% and preferably 1–2% based on the weight of the tertiary alcohol. The catalyst may be used by adding the entire amount to the tertiary alcohol at the beginning of the reaction, or it may be added in several portions thereto during the course of the reaction.

The ketene is contacted with the tertiary alcohol by any of the usual devices employed to contact a gas and a liquid such as by means of high speed stirrers, perforated gas diffusion plates, or the like. The reaction is run at a temperature range of 10° C.–80° C., and preferably within a range of 30°–50° C. The products obtained are conveniently separated from the reaction mass by distillation. In some cases, it may be desirable to employ inert solvents in the reaction mass such as ethyl ether, benzene, dioxane, and the like. In the usual operations it is preferred to use excess tertiary alcohol to impart the desired fluidity to the mass. As the resulting product is substantially entirely the tertiary alcohol acetate, the product is purified merely by separating the unreacted alcohol from the mass by a distillation procedure. The process in accordance with my invention is conveniently carried out by placing the tertiary alcohol to be acetylated in a vessel and mixing therewith one of the catalysts as prescribed. Ketene is then passed into the suspension of the catalyst in the alcohol accompanied by agitation until the desired amount of ketene has been absorbed therein at a temperature within the range specified. Upon the completion of this absorption, the reaction is substantially complete, and the separation referred to is then performed.

The process of my invention is applicable to the acetylation of either saturated tertiary alcohols or unsaturated tertiary alcohols. Some of the saturated tertiary alcohols which may be acetylated in accordance with the process described herein are ter-butyl alcohol, ter-amyl alcohol, 2-methyl-2-hydroxy pentane, 3-ethyl-3-hydroxy hexane, and the like. Of the unsaturated tertiary alcohols, either tertiary alcohols containing an olefinic double bond, such as dimethyl vinyl carbinol, ethyl methyl vinyl carbinol, and 2-hydroxy-2-methyl-pentene-4, or tertiary alcohols containing acetylenic linkage such as dimethyl ethinyl carbinol, ethyl methyl ethinyl carbinol, and methyl isobutyl ethinyl carbinol, may be acetylated by a method in accordance with my invention.

The following examples illustrate my invention:

*Example 1.*—1 part of silica-alumina-zirconia catalyst prepared as described in U. S. Patent No. 2,347,648 of Thomas et al. (page 3, column 2, line 65 to page 4, column 1, line 29) in the form of a 200-mesh powder was dispersed in 200 parts of tertiary butyl alcohol. Ketene was passed into the suspension at 40° C. with strong agitation until 40–45 parts of the ketene was absorbed. One more part of catalyst was added and another 25–30 parts of ketene was then introduced into the liquid. The introduction of gas into the liquid may be by means of any gas and liquid contact apparatus which assures a good mixing of the ketene and the alcohol. After the ketene had been introduced into the mass, the catalyst was filtered from the reaction mixture. Distillation removed any unreacted alcohol, and the tertiary butyl acetate was obtained in a yield 85–90% of theoretical. This material boiled at 94–95° C. The saponification equivalent of the product was 116.7, theoretical being 116.1. When no catalyst was used in the preceding procedure, a yield of but 10% of the tertiary butyl acetate was obtained.

*Example 2.*—Tertiary amyl alcohol was acetylated in the same manner as described in Example 1, using that alcohol instead of tertiary butyl alcohol in that example. An 80% yield of the acetate of tertiary amyl alcohol was obtained.

*Example 3.*—1 part of silica-alumina-thoria catalyst was mixed with 86 parts of dimethyl vinyl carbinol in 150 parts of dry isopropyl ether. Ketene was introduced into the agitated liquid at a temperature of 30–40° C. until 42 parts of the ketene had been absorbed. The catalyst was filtered off and the reaction mass was distilled to give a 75% yield of the acetate of the dimethyl vinyl carbinol boiling at 117°–120° C.

*Example 4.*—1 part of silica-alumina-zirconia catalyst was suspended in 200 parts of dimethyl ethinyl carbinol. Ketene was introduced into the agitated mass at 25° C. until 20–25 parts of ketene had been absorbed. Another part of catalyst was added and 20–25 parts of ketene was then introduced. The catalyst was then filtered off and the reaction mass was distilled to give a 75–80% yield of dimethyl ethinyl carbinol acetate boiling at 124–127° C.

The catalysts which may be employed in accordance with my invention may be either an alumina-silica-zirconia catalyst consisting of a 4–30% by weight of alumina, 55% by weight of silica, and 1–15% by weight of zirconia, an alumina-silica-thoria catalyst consisting of 4–30% by weight of alumina, 55–90% by weight of silica, and 1–15% by weight of thoria, or an alumina-silica-boron oxide catalyst consisting of 4–30% by weight of alumina, 55–90% by weight of silica and 1–15% by weight of boron oxide. If desired, a mixture of these catalysts may be employed. These catalysts are described in detail in U. S. Patent No. 2,462,357 of myself and Hugh J. Hagemeyer, Jr. The catalyst is preferably employed in the form of a fine powder of 150–300 mesh, although other physical forms such as flakes or granules may be useful in various processes in accordance with my invention.

I claim:

1. A method for preparing an acetate of a tertiary aliphatic alcohol which comprises suspending in the alcohol a catalyst selected from the group consisting of silica-alumina-zirconia catalyst, the silica-alumina-thoria catalysts and the silica-alumina-boron-oxide catalysts and then contacting the liquid mass with ketene at a temperature of 10–80° C.

2. A method of preparing an acetate of a tertiary aliphatic alcohol which comprises suspending a silica-alumina-zirconia catalyst in the alcohol and then contacting the liquid mass with ketene at a temperature of 10–80° C.

3. A method of preparing an acetate of a tertiary aliphatic alcohol which comprises suspending a silica-alumina-thoria catalyst in the alcohol and then contacting the liquid mass with ketene at a temperature of 10–80° C.

4. A method of preparing the acetate of a tertiary butyl alcohol which comprises suspending a silica-alumina-zirconia catalyst in the alcohol and then contacting the same with ketene.

5. A method of preparing the acetate of a tertiary amyl alcohol which comprises suspending a silica-alumina-zirconia catalyst in the alcohol and then contacting the same with ketene.

6. A method of preparing the acetate of a dimethyl vinyl carbinol which comprises suspending a silica-alumina-thoria catalyst in the dimethyl vinyl carbinol, and then contacting it with ketene.

7. A method of preparing the acetate of a dimethyl ethinyl carbinol which comprises suspending a silica-alumina-zirconia catalyst in the dimethyl vinyl carbinol and then contacting it with ketene.

References Cited in the file of this patent

UNITED STATES PATENTS

| Number | Name | Date |
|---|---|---|
| 1,898,687 | Rice | Feb. 21, 1933 |
| 2,018,759 | Frolich et al. | Oct. 29, 1935 |

OTHER REFERENCES

Pearce et al.: J. Phys. Chem., 1925, vol. 29, pp. 256–270.

Spangenberg: Industria de Quimica (Buenos Aires), vol 7 (Argentina), 1945, pp. 393–4.